March 28, 1967 G. V. BOYNTON 3,310,924
PARTITION CONSTRUCTION WITH BLOCKS SUPPORTED BY A WIRE LATTICE
Filed Aug. 4, 1964
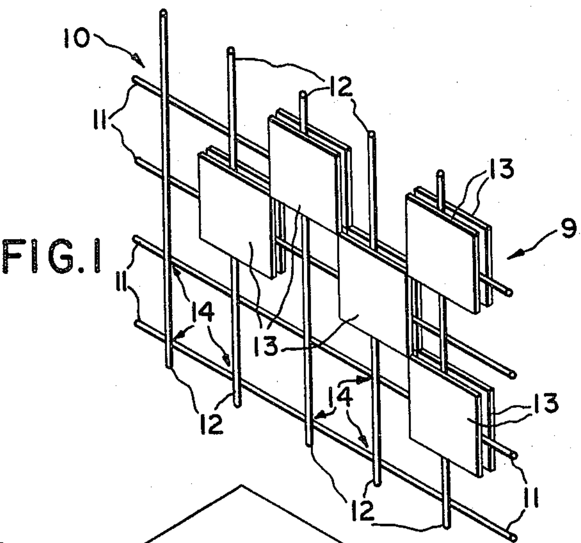
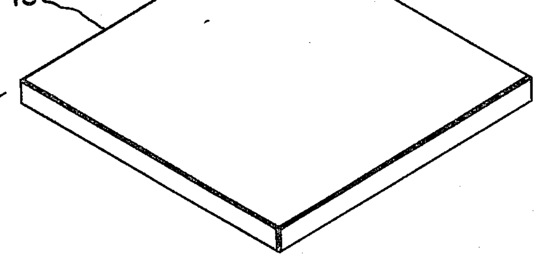
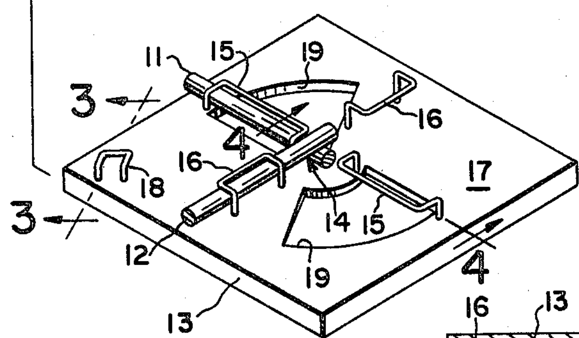
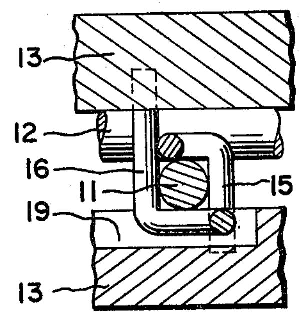
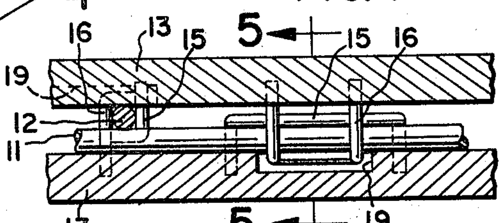
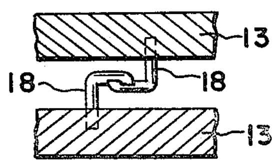
INVENTOR.
GEORGE V. BOYNTON
BY
Townsend and Townsend
ATTORNEYS United States Patent Office 3,310,924
Patented Mar. 28, 1967

3,310,924

PARTITION CONSTRUCTION WITH BLOCKS SUPPORTED BY A WIRE LATTICE

George V. Boynton, 910 Rockefeller Place., Sunnyvale, Calif. 94087

Filed Aug. 4, 1964, Ser. No. 387,278
7 Claims. (Cl. 52—565)

This invention relates to a partition construction and particularly pertains to a partition formed by securing preformed blocks to a series of rods forming a supporting structure.

An object of this invention is to provide a simple and inexpensive means for constructing a decorative wall or partition.

Another object of this invention is to provide a means for constructing a simple but very durable and stable wall or partition.

Yet another object of this invention is to provide means for fastening blocks suitable for partition construction to a series of interengaged rods forming a supporting structure.

Still another object of this invention is to provide means for attaching and interlocking to each other opposed faces of identical blocks over a supporting structure in order to mask the supporting structurre between the facings formed by the blocks.

Other objects of this invention will become apparent upon reading the accompanying specification and viewing the accompanying drawings.

FIG. 1 is a perspective view of a portion of a partition embodying the present invention;

FIG. 2 is an exploded perspective view showing the attaching and interlocking fasteners and clips in the blocks of the present invention;

FIG. 3 is a partial sectional view on the line 3—3 of FIG. 2;

FIG. 4 is a partial sectional view on the line 4—4 of FIG. 2;

FIG. 5 is a partial sectional view on the line 5—5 of FIG. 4.

Referring now to the drawings and with particular reference to FIG. 1, a partition generally indicated at 9 is formed by assembling an array of blocks 13 on a wire lattice generally indicated as 10. The wire lattice is made up of two groups of wires 11 and 12, the wires in each of the groups being parallel to and spaced apart from one another and intersecting the wires of the other group at substantially right angles. The wires 11 are contained in a plane parallel to a plane containing wires 12 and the wires 11 and 12 are secured together such as, for example, by spotwelds at each of the intersections 14. Each of the blocks 13 is supported on the lattice 10 at an intersection 14 by pairs of fasteners 15 and 16. These fasteners 15 and 16 project from a face 17 of the block 13 and are aligned with the respective rods 11 and 12.

The pairs of fasteners 15 and 16 are preferably formed of wire spring steel although obviously they could be made of other materials, and, instead of wire, the whole of the fastener elements could be made of one solid elongate flange member. The wire of the fasteners is bent to form a right angle member with the ends of the wire forming one side of the right angle member embedded in the block 13 when the block is formed. This one side of the right angle member projects from the block face 17 a sufficient height, as described in greater detail below, so that the other or contacting side of the angle member which extends parallel to the block face 17 can hold the rod 11 or 12 associated therewith.

Each of the pairs of fasteners 15 and 16 includes two fasteners positioned on one line through the center of the block and opening in opposite directions on opposite sides of the center of the block. The contacting side of each fastener 15 is located above the block face 17 a distance equal to the diameter of the rods 11 for holding the rods 11 against the face 17 while the contacting side of each fastener 16 extends above the face 17 a distance substantially equal to twice the diameter of the rods for holding rods 12 to the block 13.

Each of the blocks 13 is provided with a clip 18. Clip 18 is preferably formed of wire spring steel although obviously, as in the case of pairs of fasteners 15 and 16, it could be made of other material. Again, as in the case of pairs of fasteners 15 and 16, clip 18 is bent to form a right angle member with the ends of the wire forming one side of the right angle member embedded in block 13 when the block is formed. This one side of clip 18 projects from the block 17 a height, as described more fully below, so that the other side of the right angle member lies in a plane parallel to and a distance from block 17 substantially equal to the width of rods 11 or 12. Clip 18 is mounted on each of blocks 13 in the same relative position so that when two of blocks 13 are turned so that these respective block faces 17 face each other, respective clips 18 are opposite each other and open in opposite directions.

Blocks 13 for forming partition 9 may be made of any suitable surfacing material such as concrete or plastic and may be formed in simple and inexpensive molds such as those made from the alloy marketed under the name Cerrotru ® by Cerro De Pasco Corp. Furthermore, blocks 13 may be formed in any one of a variety of dimensions and designs.

Blocks 13 are each molded with two depressions 19 in block face 17. One of the depressions 19 extends arcuately from the base of one of the fasteners 15 to a point near to the base of one of the fasteners 16. The second of the depressions 19 extends arcuately from the base of the other of the fasteners 15 to a point near the base of the other of the fasteners 16. Each of the depressions 19 are of a width slightly greater than the width of the fasteners 16, the width of fasteners 16 being measured along the imaginary line through the center of the block on which fasteners 16 are positioned. The depth of each of the depressions 19 is slightly greater than the thickness of the contacting side of fasteners 16. Blocks 13 are made of uniform construction, provision being made, as explained below, for interlocking two of blocks 13 without the need of separate male and female blocks for this purpose.

A block 13 is secured to rods 11 and 12 by means of fasteners 15 and 16. This is accomplished by placing by hand block 13 against rods 11 and 12 in a position such that the intersection 14 contacts block face 17 in the area of block face 17 centrally disposed between fasteners 15 and 16. Block 13 is then firmly twisted so as to clamp pairs of fasteners 15 over one of the intersecting rods 11 and 12 and fasteners 16 over the other of the intersecting rods 11 and 12. When wire lattice 10 is to be surfaced on both sides by blocks 13 as shown in FIG. 1, the blocks 13 forming the second surface are twisted onto wire lattice 10 in a manner similar to the procedure followed in mounting blocks 13 forming the first surface. However, in mounting one of blocks 13 opposite another of blocks 13 on wire lattice 10, the second of these blocks 13 will be twisted on wire lattice 10 in such a manner that fasteners 16 of the second of these blocks 13 clamp over fasteners 15 of the first of these blocks 13. This is accomplished by guiding fasteners 16 of the second of these blocks 13 in the depressions 19 of the first of these blocks 13. By following this procedure, fasteners 16 of the first block 13 will thereby clamp over fasteners 15 of the second block 13 with rod 11 adjacent the face of second block 13. As can be readily seen, rod 12 similarly adjoins the face of first block 13. When two of the blocks 13 are fastened together in this manner over wire lattice 10 opposing clips 18 come together and lock by friction in an overlapping-underlapping manner as illustrated in FIG. 3. This friction lock provided by clips 18 allows blocks 13 on opposite sides of support structure 10 to cooperate in their own mutual support independent of rods 15 and 16. Further this lock prevents the blocks from being detached except by a firm twisting motion.

Although the foregoing invention has been described in some detail by way of illustration and example for purposes of clarity and understanding it is understood that certain changes and modifications may be practiced within the spirit of the invention as limited only by the scope of the appended claims.

It is claimed:

1. Apparatus for constructing walls and partitions which comprises a supporting structure formed by a first and a second group of parallel wire rods, said first and said second group of parallel wire rods lying in adjacent parallel plans and interconnected at right angles; blocks suitable for attachment to said supporting structure at one face of said blocks, said blocks each including a first pair of wire spring steel fasteners anchored in each of said blocks and protruding from said block face, said fasteners being in alignment adjoining one wire rod of the group in the plane closest said face, said fasteners being formed with a substantially right angle bend relative to that portion of said fastener anchored in said block, said right angle bend at sufficient height from said block face to clamp one of said rods of the group in the closest plane between said block face and said right angle bend, said blocks further including a second pair of wire steel spring fasteners anchored in each of said blocks and protruding from said block face, said second pair of fasteners being in alignment with one wire rod of the group in the plane furthest from said face and at right angles to said first pair of wire spring steel fasteners, said second pair of fasteners being formed with a substantially right angle bend relative to that portion of said fastener anchored in said block with said right angle bend at sufficient height from said block face to contain therebetween said one wire rod of said furthest group and a first pair of fasteners of a similar block attached on the opposite side of said supporting structure, each of said blocks further including a wire spring steel clip anchored therein and protruding therefrom, said clip being formed with a substantially right angle bend, said right angle of said clip at a height which will permit cooperative clamping with a similar clip attached to a similar block on the opposite side of said supporting structure, each of said blocks further defining a pair of depressions in said block face, said depressions located in said face of said block beneath said first pair of fasteners, each of said depressions having a depth sufficient to receive one of said second fasteners of a block attached to the opposite side of the structure and having a width sufficient to permit blocks on opposite sides of the supporting structure to be nested together and twisted into place.

2. Apparatus for constructing walls and partitions which comprise: a supporting structure formed by two groups of parallel rods; said two groups of parallel rods being interconnecting in parallel planes, means for supporting interlocking blocks on opposite sides of said structure over identical portions of said structure which comprises a first pair of wire fasteners anchored in each of said blocks protruding from one block face, each of said first pair of fasteners being in alignment one with the other for adjoining one of said parallel rods of the one group closest said block face, each of said first pair of fasteners formed with a substantially right angle bend, said right angle bend at a height from said block face to clamp one of said rods of said one group between said right angle bend and said block face; a second pair of wire fasteners anchored in each of said blocks protruding from said block face; each of said second pair of fasteners being in alignment on said block face relative to each of said first pair of fasteners for adjoining one of said parallel rods of said other group when each of said first pair of fasteners is aligned with said rod of said one group; and each of said second pair of fasteners being formed with a substantially right angle bend, said right angle bend at sufficient height to clamp said rod of said other group between said right angle bend and said block face.

3. Apparatus for constructing walls and partitions according to claim 2 wherein said blocks define a pair of depressions in said block face; each depression located at the base of one of said first pair of fasteners; said depressions of sufficient depth to allow a second pair of fasteners of another of said blocks attached to the opposite side of said supporting structure to fit between said adjoining rod of said one group and said block face whereby said block face is immediately in contact with one of said parallel rods of said one group.

4. Apparatus for constructing walls and partitions according to claim 2 and including means affixed to said blocks for interlocking blocks on opposite sides of said structure with one another independent of said structure, said interlocking means comprising a wire clip anchored in said blocks protruding from said block face, said clips being formed with a substantially right angle bend, said right angle bend at a sufficient height from said block face to cooperatively engage a similar clip from a similar block attached to the opposite side of said supporting structure.

5. Apparatus for constructing walls and partitions according to claim 2 and wherein: said first and said second group of said parallel rods are interconnected at right angles.

6. Apparatus for constructing walls and partitions in cooperation with a supporting structure formed from two groups of rods with each group including a plurality of parallel rods and the two groups lying in adjacent parallel planes and interconnected at right angles, said apparatus comprising: blocks for forming the sides of said walls and partitions; said blocks having faces for engaging said supporting structure; a first pair of fasteners aligned for adjoining one of said rods of one group; a second pair of fasteners aligned for adjoining one of said rods of the other group with the second pair of fasteners aligned along a first line perpendicular to and bisecting the line between said first pair of fasteners with the second pair of fasteners equally spaced from the second line; each of said fasteners having a portion anchored in said block and a portion extending from said block face, said portion extending from said block face formed with a substantially right angle bend with the right angle bend at sufficient height from the block face to clamp an adjoining rod between said bends and said block face with said bends on each fastener of said first pair of fasteners opening on opposite sides of the rod of the one group; said bends of said second pair of fasteners at sufficient height from said block face to clamp said adjoining rod of the other group between said bends and said block face; said bends on each fastener of said second pair of fasteners opening on opposite sides of said rod of said second group; and said bends of said first pair of fasteners being directed relative to said bends of said second pair of fasteners for simultaneous rotational engagement with said rods of said supporting structure.

7. The apparatus of claim 6 characterized further in that each of said fasteners includes a piece of wire anchored at both ends in said block with the medial portion of said wire extending outwardly from said block face, said medial portion having a bend substantially parallel to said block face.

(References on following page)

References Cited by the Examiner

UNITED STATES PATENTS

| | | | |
|---|---|---|---|
| 648,869 | 5/1900 | Horn | 52—484 |
| 1,052,788 | 2/1913 | Bates | 52—293 |
| 2,090,804 | 8/1937 | Nelsson | 52—422 X |
| 2,821,850 | 2/1958 | Adelt | 52—238 X |
| 2,900,929 | 8/1959 | Adelt | 52—240 X |
| 3,142,938 | 8/1964 | Eberhardt | 52—391 X |

FRANK L. ABBOTT, *Primary Examiner.*

A. C. PERHAM, *Assistant Examiner.*